(12) United States Patent
McLaughlin et al.

(10) Patent No.: US 8,582,808 B2
(45) Date of Patent: Nov. 12, 2013

(54) METHODS FOR IDENTIFYING ROOFTOPS USING ELEVATION DATA SETS

(75) Inventors: Edgar J. McLaughlin, Lloyd Harbor, NY (US); Alan Pate, New Fairfield, CT (US); Richard J. Spanbauer, Port Jefferson, NY (US); Mark R. Guadino, Manhasset, NY (US)

(73) Assignee: CSC Holdings, LLC, Bethpage, NY (US)

( * ) Notice: Subject to any disclaimer, the term of this patent is extended or adjusted under 35 U.S.C. 154(b) by 105 days.

(21) Appl. No.: 13/067,649

(22) Filed: Jun. 16, 2011

(65) Prior Publication Data

US 2012/0321129 A1   Dec. 20, 2012

(51) Int. Cl.
*G06K 9/00* (2006.01)
*H04N 5/225* (2006.01)
*B60H 1/00* (2006.01)

(52) U.S. Cl.
USPC ............................ 382/103; 348/169; 454/136

(58) Field of Classification Search
USPC .......... 382/103, 107, 239; 348/169, 170, 171, 348/172, 208.1, 208.2, 208.14; 454/136, 454/242, 250; 52/272, 302.1, 746.11, 52/749.12
See application file for complete search history.

(56) References Cited

U.S. PATENT DOCUMENTS 7,920,072 B2 * 4/2011 Smith et al. ................. 340/995.1
8,065,854 B1 * 11/2011 Doberstein et al. ........ 52/746.11

* cited by examiner

*Primary Examiner* — Abolfazl Tabatabai
(74) *Attorney, Agent, or Firm* — Sterne, Kessler, Goldstein & Fox P.L.L.C.

(57) ABSTRACT

In an embodiment, a method for identifying building unit rooftops, and their associated heights and locations is provided. The method includes subtracting a bare earth layer from a first return layer within a LIDAR data set for a geographic area of interest to form an above ground level (AGL) layer data set. A height mask is then applied to the AGL layer data set to form a building units data set. The building units data set includes data representative of potential building unit rooftops. This data set is refined through the application of a series of filters and masks to remove clutter (e.g., trees, bushes and other non-building unit structures) to refine the data set.

38 Claims, 12 Drawing Sheets

(10 of 12 Drawing Sheet(s) Filed in Color)

Sample Area - Image

Sample Area: 8-30 Feet AGL

Sample Area: Use of Land Parcel Boundaries

Sample Area: After Filtering Based on Land Parcel Boundaries

Sample Area     Sample Area with Slope Overlay

Sample Area: After Slope Filtering

Example Area. After applying Building Unit Area Filter

ND FOR IDENTIFYING ROOFTOPS
METHODS FOR IDENTIFYING ROOFTOPS USING ELEVATION DATA SETS

BACKGROUND OF THE INVENTION

1. Field of the Invention

This invention relates generally to elevation data analysis, and more specifically to the use of elevation data to identify building unit rooftops.

2. Background Art

Being able to efficiently identify building unit rooftops, including their height and location, is a critical determination for the deployment of wireless communications services. For large geographical regions, rooftops are typically manually/visually located using geo-coded aerial photography. Street addresses are normally estimated from location using conventional GPS-style interpolations. Unfortunately, the resulting information is often difficult to obtain, and roof heights and locations cannot be reliably determined from aerial photography.

What is needed therefore are systems, methods, and computer program products that enable efficient processing of elevation data sets to identify building unit rooftops and their corresponding height and location.

BRIEF SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In an embodiment, a method for identifying building unit rooftops, and their associated heights and locations is provided. The method includes subtracting a bare earth layer from a surface layer within an elevation data set for a geographic area of interest to form an above ground level (AGL) layer data set. In an embodiment, the elevation data set is a light detection and ranging (LIDAR) data set and the surface layer is a first return layer within a LIDAR data set. A variety of techniques can be used to collect the LIDAR data, including, but not limited to, using airborne systems—both manned systems and remote platforms, and using vehicular-mounted systems. In other embodiments, other techniques can be used to collect the elevation data, such as, for example, using RADAR or a variant of three dimensional photography. In embodiments, the bare earth data layer and the surface layer data can be obtained using the same data gathering method or through different methods.

A height mask is applied to the AGL layer data set to form a building units data set. The building units data set includes data representative of potential building unit rooftops. This data set is refined through the application of a series of filters and masks. Specifically, steps are provided to remove clutter (e.g., data representative of trees, bushes, and other structures that are not building units).

In an embodiment, a slope filter is applied to the data representative of potential building unit rooftops to remove tree clutter. The slope filter is based on the differences in the slopes of rooftops and trees.

Additionally, the data representative of potential building unit rooftops can also be masked with land parcel boundary data. In doing so, a buffer zone for each land parcel that lies within the land parcel boundaries is created. Within each buffer zone, data representative of potential building unit rooftops that exist outside the land parcel buffer zone and within the land parcel boundary is determined to be clutter and removed.

Other steps include filtering the potential building units data set to identify individual residential units within contiguous structures and removing data associated within potential building units data existing within polygons that are not within an area range representative of the size of a building unit.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The patent or application file contains at least one drawing executed in color. Copies of this patent or patent application publication with color drawing(s) will be provided by the Office upon request and pament of the necessary fee.

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 5:

FIG. 5 provides an aerial photography image of a sample geographic area.

Figure 6:
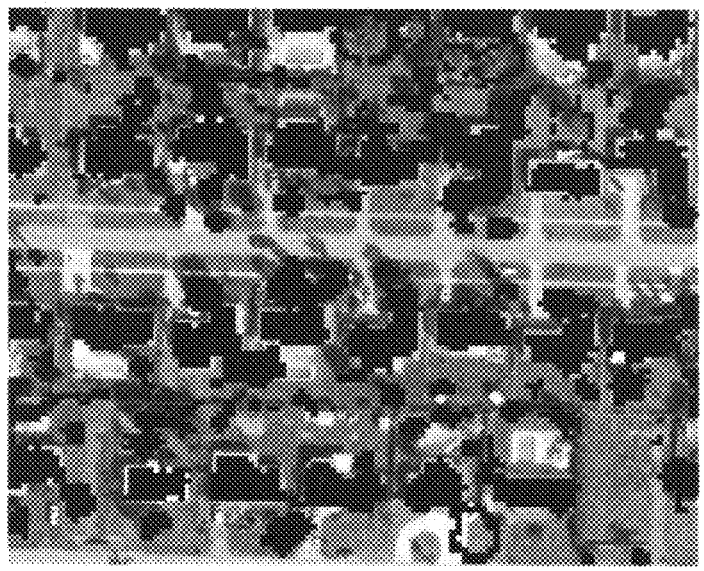

FIG. 6 illustrates a sample area following the application a height mask, according to an embodiment of the invention.

Figure 7:

FIG. 7 illustrates a sample area following the application of a land parcel mask, according to an embodiment of the invention.

Figure 8:

FIG. 8 illustrates a sample area following the application of a land parcel mask in which clutter has been removed, according to an embodiment of the invention.

Figure 9A:

FIG. 9a provides an aerial photography image of a sample area.

Figure 9B:
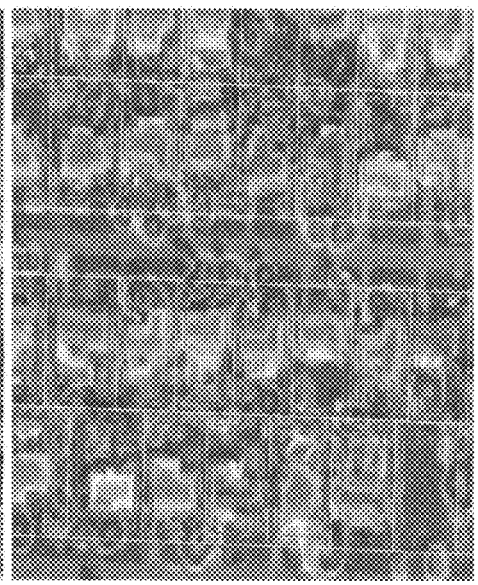

FIG. 9b provides a LIDAR data image of the sample area of FIG. 9a that highlights the slope differences of trees and rooftops, according to an embodiment of the invention.

Figure 10:

FIG. 10 illustrates a sample area after a slope filter has been applied, according to an embodiment of the invention.

Figure 11:

FIG. 11 illustrates a sample area after a building unit area filter has been applied, according to an embodiment of the invention.

Figure 12:
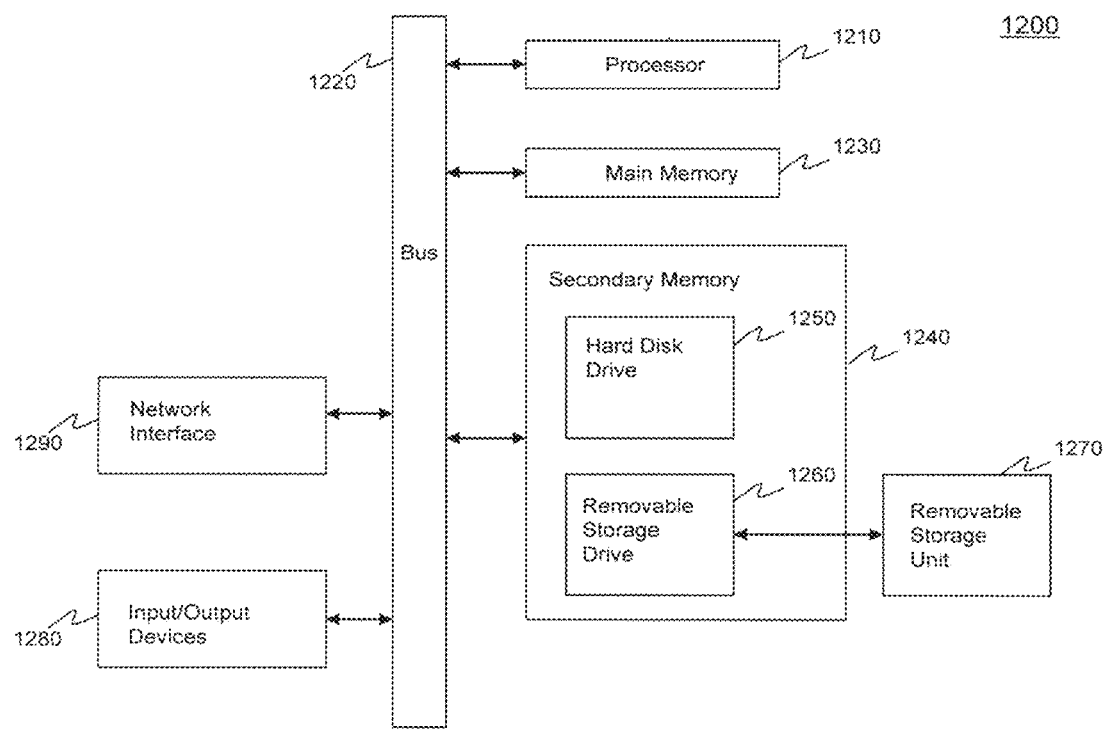

FIG. 12 provides a diagram of a computer system on which the methods and systems herein described can be implemented, according to an embodiment of the invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 1:
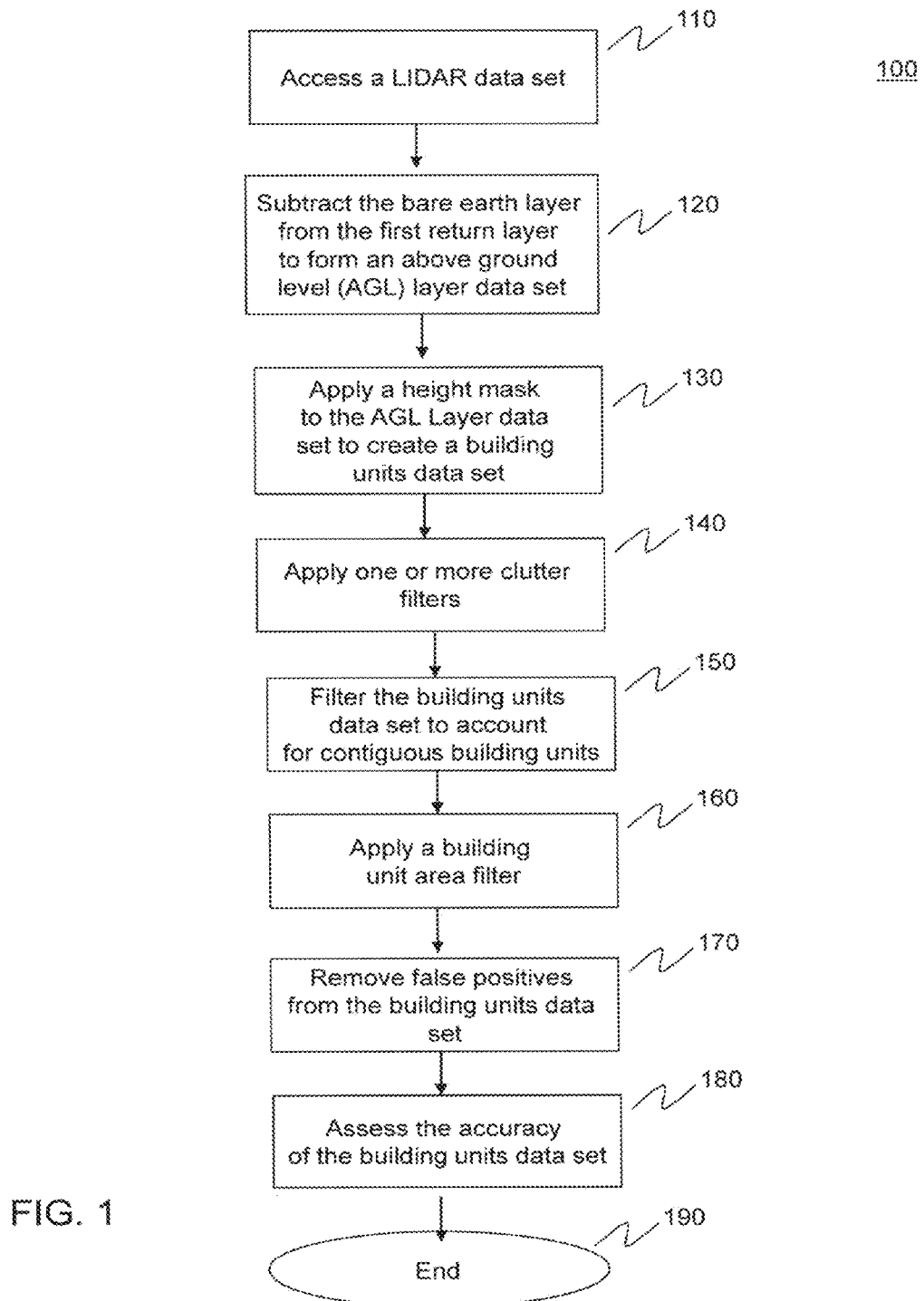
FIG. 1 is a flowchart of a method for identifying rooftops, according to an embodiment of the invention.

FIG. 1 provides a method 100 for identifying building unit rooftops, according to an embodiment of the invention. Method 100 begins in step 110. In step 110, a light detection and ranging (LIDAR) data set for a geographic area of interest is accessed. The LIDAR data set is gridded into a bare earth layer and a first return layer, which may be referred to generally as a surface layer. The example embodiments throughout the specification refer to LIDAR data sets. The invention is not limited to the use of LIDAR data. Rather, other types of elevation data can be used, such as, for example, data collected by RADAR or a variant of three-dimensional photography. Additionally, in embodiments the bare earth layer and first return layer (or surface layer) data may be obtained through different measurement techniques.

LIDAR describes a profiling system that produces location and elevation data to define the surface of a geographic area and the heights of above ground features. LIDAR systems mounted on aircraft use the near-infrared portion of the electro-magnetic light spectrum to collect data. Other types of LIDAR systems can be used to gather the LIDAR data set, including, but not limited to, remote controlled airborne systems and vehicular mounted systems.

Typical airborne LIDAR systems use a laser source and detector, a scanning mechanism, airborne GPS and inertial measurement unit (IMU) equipment, and high resolution clocking devices for timing laser emissions, reflections, GPS/IMU measurements, and scan-angle measurements. High performance computers and high capacity data recorders are also used.

LIDAR systems collect data in the following manner. Multiple flight lines of a LIDAR system are conducted over an area of interest. During the flight lines, repeated laser light pulses are emitted and the precise time recorded. The reflection of the laser pulses from the surface is detected and the precise time is recorded. Using the constant speed of light, the time difference between the emission and the reflection can be converted into a slant range distance. With the very accurate position and orientation of the sensors provided by the airborne GPS and IMU data, the XYZ coordinate of the reflective surface can be calculated.

In multiple return LIDAR systems, both range and intensity data are obtained from a single pass. Intensity data measure the return signal strength, based on the way the object struck reflects the LIDAR energy. Intensity data is consistent among similar objects, making is possible to map the information in the form of a matrix, giving the appearance of a gray-scale image.

Figure 2:
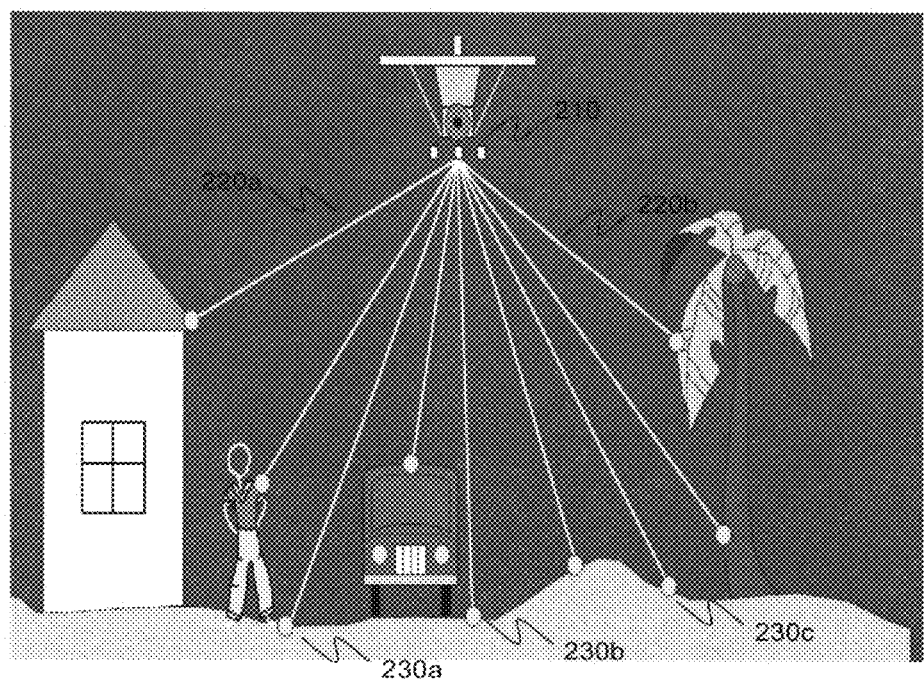
FIG. 2 is an illustration of a multiple return LIDAR system.

FIG. 2 provides a simplified illustration of a multiple return LIDAR system. In multiple return LIDAR systems, the first pulse measures the range to the first object encountered. The last pulse measures the range to the last object. By acquiring first and last pulse data simultaneously; it is possible to measure, for example, both tree and rooftop heights (referred to as a first return layer or a canopy layer) and the topography of the ground level (referred to as a bare earth layer). Referring to FIG. 2, LIDAR system 210 emits laser pulses, such as pulses 220a-b and 230a-c. Laser pulses 220a and 220b are representative of first pulses that provide data for the canopy layer, whereas laser pulses 230a, 230b and 230c are representative of secondary pulses that provide data for the ground level or bare earth level.

Figure 3:
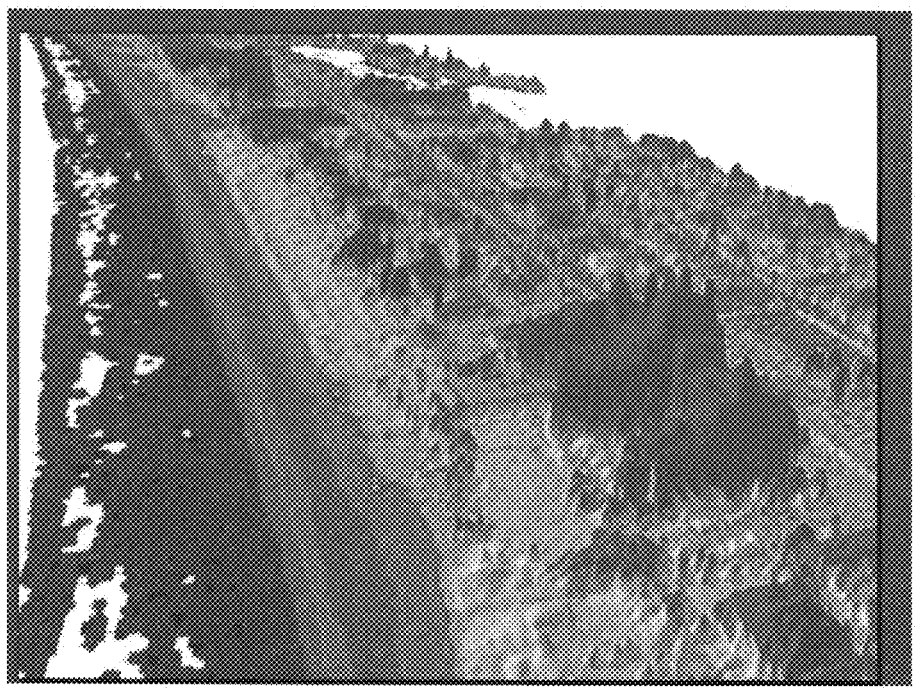
FIG. 3 is an image of LIDAR data that shows variation in height and slope of objects within a geographic area.
Figure 4A:
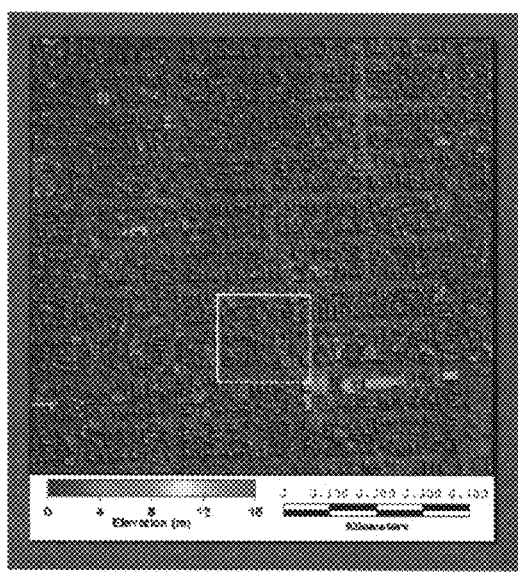
FIG. 4a is an image of LIDAR data that shows a bare earth layer.
Figure 4B:
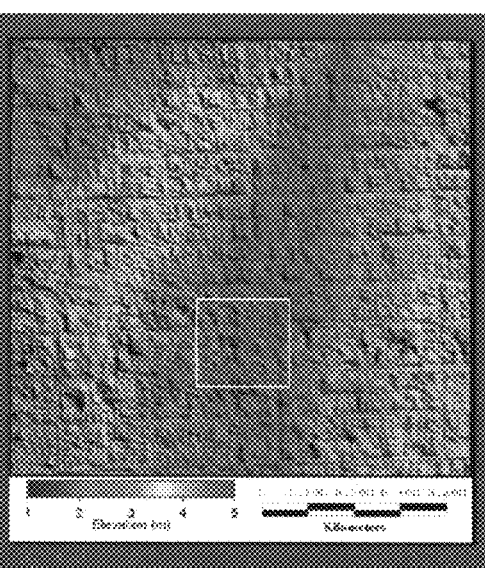
FIG. 4b is an image of LIDAR data that shows a canopy level layer.

Upon completing a series of flight lines to gather the LIDAR data, a geographic area can be represented in a three dimensional image that identifies the location, height and slope of objects. Once such depiction is shown in FIG. 3. FIG. 3 provides an image of LIDAR data that shows variation in height and slope using a color scheme in which higher elevation items are depicted in red, lower elevation in yellow and ground level items in shades of green. FIG. 4a provides a bare earth layer for a portion of FIG. 3, while FIG. 4b provides a canopy level layer for the same portion of FIG. 3.

LIDAR data sets are extensive in size. For example, the methods described herein were developed using LIDAR data for three geographical areas. Area A included 207,000 acres (one county). Collecting the data used 152 flight lines, and the data included 563 million data points. Area B included 100,000 acres (one county). Collecting the data used 36 flight lines, and the data included 281 million data points. Area C included 218,000 acres (one county). Collecting the data used 147 flight lanes, and the data included 1.45 billion data points. The data sets were organized into 5000×5000 foot tiles that included first return or canopy layer data and bare earth layer data. The LIDAR data sets analyzed include a sampled resolution of 4-5 feet in the horizontal direction and a few tens of centimeters accuracy in the vertical dimension.

Returning to FIG. 1, in step 120, the bare earth layer is subtracted from the first return layer to form an above ground level (AGL) layer data set. For example, the ARCGIS 3D ANALYST "minus" function is applied to the LIDAR data set to form the AGL layer data set. ARCGIS is a standards-based system for using geographic information, and manipulating LIDAR data. ARCGIS is available from Esri Corporation, headquartered in Redlands, Calif.

For the purpose of illustrating the remaining steps within method 100, FIGS. 5-10 will be used to highlight each of the steps and the impact the steps have on the LIDAR data set to develop and refine a building units data set. FIG. 5 provides an example area using aerial photography. This image will be used as a baseline image to highlight how the various filtering and masking steps are used to condition and analyze the LIDAR data to develop a building units data set that provides height, location, and slope information corresponding to rooftops. While FIG. 5 only shows residential building units and method 100 is explained in the context of residential building units, the invention is not limited to residential building units, but also applies to commercial building units as will be known to individuals of ordinary skill in the art upon reviewing the present specification.

In step 130, a height mask is applied to the AGL layer data set to form a building units data set. The building units data set includes data representative of potential building unit rooftops. In an embodiment, applying a height mask to the AGL layer data set to form a building units data set includes establishing two height limits and classifying data values within the range of the two height limits as potential building unit rooftops. The specific parameters of the mask are set based on characteristics of residential home construction in the area under study. Determining the parameters is an empirical and interactive process to try to balance false positives and negatives in targeting houses.

In an embodiment, this step is performed using the ARCGIS 3D Analyst "reclass" function. All terrain values between the two height limits are re-classified to a "1" to form the first estimate of a residential building presence. FIG. 6 illustrates the sample area following the application of this step in which the height parameters used were 8 and 30 feet. The black polygons within FIG. 6 represent structures that fall within this range.

In step 140, one or more clutter filters is applied to remove clutter from the building units data set. To reduce the feature "noise" due to trees, high resolution (1 foot) RGB based imagery, such as is available from the United States Geographical Service can be used. As will be understood by persons of ordinary skill in the art, based on the teachings herein, other RGB based imagery including, but not limited to high resolution color photography, can also be used. This color imagery is corrected to the building units data set to enable removal of clutter through an RGB filter. Specifically, in an embodiment, a color RGB filter is applied to the building units data set to differentiate between rooftops and clutter. For example, to eliminate clutter associated with trees a single color RGB filter is applied to differentiate between rooftops and green trees. The filter or mask developed is used to multiply the height sliced layer produced in step 130. To perform this step, for example, the ARCGIS 3D Analyst "times" function can be used. Data associated with green trees is removed from the building units data set.

In another embodiment, the data representative of potential building unit rooftops is masked with land parcel boundary data. For example, the Florida Department of Revenue maintains a GIS layer documenting all the residential land parcels and their boundaries. See, e.g., ftp://sdrftp03.dor.state.fl.us/. Referring to FIG. 7, the yellow boundaries, such as boundary 710, are the nominal land parcel boundaries. A buffer zone for each land parcel that lies within the land parcel boundaries is established. The red boundaries, such as boundaries 720a, 720b and 720c are derived by taking a 10 foot buffer internal to each of the land parcels to better approximate the location of any residential structure. The 10 foot buffer value can be adjusted to other values for different embodiments. Within each buffer zone, data representative of potential building unit rooftops that exist outside the land parcel buffer zone and within the land parcel boundary is determined to be clutter. The data representative of clutter is removed from the data representative of potential building unit rooftops. FIG. 8 illustrates the sample area following application of a land parcel boundary data mask, as described above, to remove clutter. The red polygons in FIG. 8 illustrate areas remaining following the application of the land parcel boundary data mask. Data for these areas remain in the building units data set.

In another embodiment, a slope filter is applied to the data representative of potential building unit rooftops to remove tree clutter. The slope filter is based on the differences in the slopes of rooftops and trees. When examining the representation of slope for trees versus rooftops in LIDAR data, it is apparent that the measured slope associated with trees can be distinguished from the more gently sloped rooftop signatures. This is illustrated by comparing FIG. 9a and FIG. 9b, where it can be seen that high slope areas are associated with tree structures. The high slope areas within FIG. 9b are illustrated by the more intense red coloration of the image data. These red areas correspond to the trees shown in FIG. 9a. FIG. 10 illustrates the sample area after the slope filtering has occurred. The light green polygons are representative of LIDAR data remaining in the building units data set that are potentially representative of residential rooftops.

In step 150, the building units data set is filtered to account for contiguous building units. The same land parcel data information used in step 140 to remove clutter can also be used. Upon filtering the data set, contiguous building units are divided into multiple individual building units.

In step 160, a building unit area filter is applied. The building unit area filter is applied by converting areas associated with potential building units to polygons. Data within polygons that are that are not within an area range representative of a residential unit are removed from the building units data set. This step eliminates very small features that represent, for example, remaining treetops or bushes from being counted as residential units.

FIG. 11 illustrates the sample area following the application of the building unit area filter. The light blue polygons are representative of LIDAR data within the building units data set that likely represent building unit rooftops. The remaining data within the building unit data set includes data representative of potential residential rooftops that can be used to determine a count of residential units, the height of residential rooftops and the location of residential rooftops.

In an embodiment, in step 170, false positive data from the data representative of potential building unit rooftops is purged based on a comparison of the data representative of potential building unit rooftops and address information.

In various embodiments, in step 180, tests of the accuracy of the building units data set are conducted. In an embodiment, a count of potential residential units based on the data representative of potential building unit rooftops is made. This count is then compared with census counts to assess the accuracy of the data representative of potential building unit rooftops. In another embodiment, the accuracy of the building units data set is assessed by matching the data representative of potential building unit rooftops with address information.

In step 190, method 100 ends. Upon the completion of method 100, a building units data set exists that includes data representing of building unit rooftops that provides height, location, and slope information. Such a database of data sets is extremely useful, for among other uses, determining viewsheds for wireless transmitters to facilitate the deployment of wireless communications services.

Specifically, in one application the building units rooftops data set is used to determine the viewsheds for Multichannel Video and Data Distribution Service (MVDDS). MVDDS is a type of video, television and Internet delivery technology that used spectrum in the 12.2 to 12.7 GHz range to provide fast downloads. Using the building units rooftops data set permits cost-effective selection of tower sites for the placement of MVDDS antennas. Additionally, in terms of customer service utility, an extracted database is loaded into a smartphone or other mobile device, such as a tablet or laptop computer, that includes an attribute flag that indicates whether a building unit is visible from a MVDDS tower sit. This facilitates the ability of salespeople to readily identify homes to target for sales activities. Additionally, data is extracted from the building units rooftop data set that allows installation personnel to identify the ideal location on a rooftop for placement of an MVDDS dish.

The use of the present invention is not limited to MVDDS services, but can be used for any application requiring the identification of rooftops. For example, although direct broadcast satellite (DBS) only needs to understand the clearance in the immediate area around the home location at some raised elevation as opposed to a lengthy path between the home and transmitter, as in the case of MVDDS service. DBS service planners could also use the present invention to determine the visibility of each individual DBS satellite.

Though the above embodiments have been described with respect to elevation data for a geographic area of earth, persons skilled in the relevant arts will recognize that the systems and methods disclosed can be applied to the identification of target objects in any layered data set comprising at least two layers of data, and representing other than geographic objects in a geographic landscape. The layers of data in the layered data set may be either gridded or complete. They could have been obtained from a single source or process, or from multiple sources or processes. A variety of filters, including without limitation, height filters, slope filters, shape filters, size filters, discontinuity filters, as well as combinations of such, may be used to identify potential target objects.

COMPUTER SYSTEM IMPLEMENTATION

FIG. 12 is a diagram of a computer system on which the methods and systems herein described can be implemented, according to an embodiment of the invention. Computer 1200 includes one or more processors (also called central processing units, or CPUs), such as processor 1210. Processor 1210 is connected to communication bus 1220. Computer 1200 also includes a main or primary memory 1230, preferably random access memory (RAM). Primary memory 1230 has stored therein control logic (computer software), and data.

Computer 1200 may also include one or more secondary storage devices 1240. Secondary storage devices 1240 include, for example, hard disk drive 1250 and/or removable storage device or drive 1260. Removable storage drive 1260 represents a floppy disk drive, a magnetic tape drive, a compact disk drive, an optical storage device, tape backup, thumb drive, etc.

Removable storage drive 1260 interacts with removable storage unit 1270. As will be appreciated, removable storage unit 1260 includes a computer usable or readable storage medium having stored therein computer software (control logic) and/or data. Removable storage drive 1260 reads from and/or writes to the removable storage unit 1270 in a well known manner.

Removable storage unit 1270, also called a program storage device or a computer program product, represents a floppy disk, magnetic tape, compact disk, optical storage disk, thumb drive, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1200, or multiple computer 1200s to perform any combination of the functions described herein.

Computer programs (also called computer control logic) are stored in main memory 1230 and/or the secondary storage devices 1240. Such computer programs, when executed, direct computer 1200 to perform the functions of the present invention as discussed herein. In particular, the computer programs, when executed, enable processor 1210 to perform the functions of the present invention. Accordingly, such computer programs represent controllers of the computer 1200.

Computer 1200 also includes input/output/display devices 1280, such as monitors, keyboards, pointing devices, etc.

Computer 1200 further includes a communication or network interface 1290. Network interface 1290 enables computer 1200 to communicate with remote devices. For example, network interface 1290 allows computer 1200 to communicate over communication networks, such as LANs, WANs, the Internet, etc. Network interface 1290 may interface with remote sites or networks via wired or wireless connections. Computer 1200 receives data and/or computer programs via network interface 1290.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for identifying objects, comprising:
 using a processor to perform the steps of:
 accessing a layered data set for an area of interest, wherein the layered data set includes a base layer and a second layer;
 subtracting the base layer from the second layer to form an above base layer (ABL) data set; and
 applying a filter to the ABL data set to form a target object data set, wherein the target object data set includes data representative of potential target objects.

2. The method of claim 1, wherein the layered data set is gridded into the base layer and the second layer.

3. The method of claim 1, wherein the area of interest comprises a geographic area, the layered data set comprises an elevation data set, the base layer comprises a bare earth layer, the second layer comprises a surface layer, and the above base layer data set comprises an above ground level (ABL) data set.

4. The method of claim 3, wherein the target objects comprise building unit rooftops, and the target object data set comprises a building units data set.

5. The method of claim 4, wherein the filter comprises a height mask.

6. The method of claim 5, wherein the elevation data set is gridded into the bare earth layer and the surface layer.

7. A method for identifying building unit rooftops, comprising:
using a processor to perform the step of:
accessing an elevation data set for a geographic area of interest, wherein the elevation data set is gridded into a bare earth layer and a surface layer;
subtracting the bare earth layer from the surface layer to form an above ground level (AGL) layer data set; and
applying a height mask to the AGL layer data set to form a building units data set, wherein the building units data set includes data representative of potential building unit rooftops.

8. The method of claim 7, further comprising:
correlating imagery data to the building units data set; and
applying a clutter filter to the correlated building units data set to remove clutter.

9. The method of claim 8, wherein applying a clutter filter includes applying a color RGB filter to differentiate between rooftops and clutter.

10. The method of claim 9, wherein applying a color RGB filter includes applying a single color RGB filter to differentiate between rooftops and green trees.

11. The method of claim 7, further comprising:
masking the data representative of potential building unit rooftops with land parcel boundary data;
establishing a buffer zone for each land parcel that lies within the land parcel boundaries;
identifying for each buffer zone data representative of potential building unit rooftops that exist outside the land parcel buffer zone and within the land parcel boundary as clutter; and
removing clutter from the data representative of potential building unit rooftops.

12. The method of claim 7, further comprising:
applying a slope filter to the data representative of potential building unit rooftops to remove tree clutter, wherein the slope filter is based on the differences in the slope of rooftops and trees.

13. The method of claim 7, wherein building units are residential units.

14. The method of claim 13, further comprising filtering the potential building units data set to identify individual residential units within contiguous structures.

15. The method of claim 14, further comprising:
converting areas associated with potential building units to polygons;
removing polygons that are not within an area range representative of a residential unit.

16. The method of claim 7, further comprising comparing the data representative of potential building unit rooftops with census counts to assess the accuracy of the data representative of potential building unit rooftops.

17. The method of claim 7, further comprising matching the data representative of potential building unit rooftops with address information to assess the accuracy of the data representative of potential building unit rooftops.

18. The method of claim 7, further comprising purging false positive data from the data representative of potential building unit rooftops based on a comparison of the data representative of potential building unit rooftops and address information.

19. The method of claim 7, wherein applying a height mask to the AGL layer data set to form a building units data set includes establishing two height limits and classifying data values within the range of the two height limits as potential building unit rooftops.

20. The method of claim 7, wherein building units are commercial units.

21. The method of claim 7, wherein the elevation data set comprises a light detection and ranging (LIDAR) data set, and wherein the surface layer comprises a LIDAR first return layer.

22. The method of claim 21, wherein the LIDAR data set comprises LIDAR data gathered by an airborne system or vehicular mounted systems.

23. The method of claim 7, further comprising:
applying a slope filter to the data representative of potential building unit rooftops to remove tree clutter, wherein the slope filter is based on the differences in the slope of rooftops and trees;
masking the data representative of potential building unit rooftops with land parcel boundary data;
establishing a buffer zone for each land parcel that lies within the land parcel boundaries;
identifying for each buffer zone data representative of potential building unit rooftops that exist outside the land parcel buffer zone and within the land parcel boundary as clutter;
removing the clutter from the data representative of potential building unit rooftops;
filtering the potential building units data set to identify individual residential units within contiguous structures;
converting areas associated with potential building units to polygons; and
removing data associated within potential building units data existing within polygons that are not within an area range representative of a residential unit.

24. The method of claim 23, wherein applying a height mask to the AGL layer data set to form a building units data set includes establishing two height limits and classifying data values within the range of the two height limits as potential building unit rooftops.

25. The method of claim 24, further comprising purging false positive data from the data representative of potential building unit rooftops based on a comparison of the data representative of potential building unit rooftops and address information.

26. The method of claim 23, wherein the elevation data set comprises a light detection and ranging (LIDAR) data set, and wherein the surface layer comprises a LIDAR first return layer.

27. A non-transient computer-readable storage medium having stored thereon computer executable instructions, execution of which by a processing device causes the processing device to perform operations for identifying building unit rooftops, the operations comprising:
accessing an elevation data set for a geographic area of interest, wherein the elevation data set is gridded into a bare earth layer and a surface layer;
subtracting the bare earth layer from the first return layer to form an above ground level (AGL) layer data set; and
applying a height mask to the AGL layer data set to form a building units data set, wherein the building units data set includes data representative of potential building unit rooftops.

28. The non-transient computer-readable storage medium of claim 27 having stored thereon computer executable instructions, execution of which by a processing device causes the processing device to perform operations, the operations further comprising:

correlating imagery data to the building units data set; and
applying a clutter filter to the correlated building units data set to remove clutter.

29. The non-transient computer-readable storage medium of claim 27 having stored thereon computer executable instructions, execution of which by a processing device causes the processing device to perform operations, the operations further comprising:
   masking the data representative of potential building unit rooftops with land parcel boundary data;
   establishing a buffer zone for each land parcel that lies within the land parcel boundaries;
   identifying for each buffer zone data representative of potential building unit rooftops that exist outside the land parcel buffer zone and within the land parcel boundary as clutter; and
   removing clutter from the data representative of potential building unit rooftops.

30. The non-transient computer-readable storage medium of claim 27 having stored thereon computer executable instructions, execution of which by a processing device causes the processing device to perform operations, the operations further comprising:
   applying a slope filter to the data representative of potential building unit rooftops to remove tree clutter, wherein the slope filter is based on the differences in the slope of rooftops and trees.

31. The non-transient computer-readable storage medium of claim 27, wherein building units are residential units.

32. The non-transient computer-readable storage medium of claim 31 having stored thereon computer executable instructions, execution of which by a processing device causes the processing device to perform operations, the operations further comprising filtering the potential building units data set to identify individual residential units within contiguous structures.

33. The non-transient computer-readable storage medium of claim 32 having stored thereon computer executable instructions, execution of which by a processing device causes the processing device to perform operations, the operations further comprising:
   converting areas associated with potential building units to polygons;
   removing polygons that are not within an area range representative of a residential unit.

34. The non-transient computer-readable storage medium of claim 27 having stored thereon computer executable instructions, execution of which by a processing device causes the processing device to perform operations, the operations further comprising comparing the data representative of potential building unit rooftops with census counts to assess the accuracy of the data representative of potential building unit rooftops.

35. The non-transient computer-readable storage medium of claim 27 having stored thereon computer executable instructions, execution of which by a processing device causes the processing device to perform operations, the operations further comprising matching the data representative of potential building unit rooftops with address information to assess the accuracy of the data representative of potential building unit rooftops.

36. The non-transient computer-readable storage medium of claim 27 having stored thereon computer executable instructions, execution of which by a processing device causes the processing device to perform operations, the operations further comprising purging false positive data from the data representative of potential building unit rooftops based on a comparison of the data representative of potential building unit rooftops and address information.

37. The non-transient computer-readable storage medium of claim 27, wherein applying a height mask to the AGL layer data set to form a building units data set includes establishing two height limits and classifying data values within the range of the two height limits as potential building unit rooftops.

38. The non-transient computer-readable storage medium of claim 27, wherein the elevation data set comprise a light detection and ranging (LIDAR) data set, and wherein the surface layer comprises a LIDAR first return layer.

\* \* \* \* \*